Figure 1:
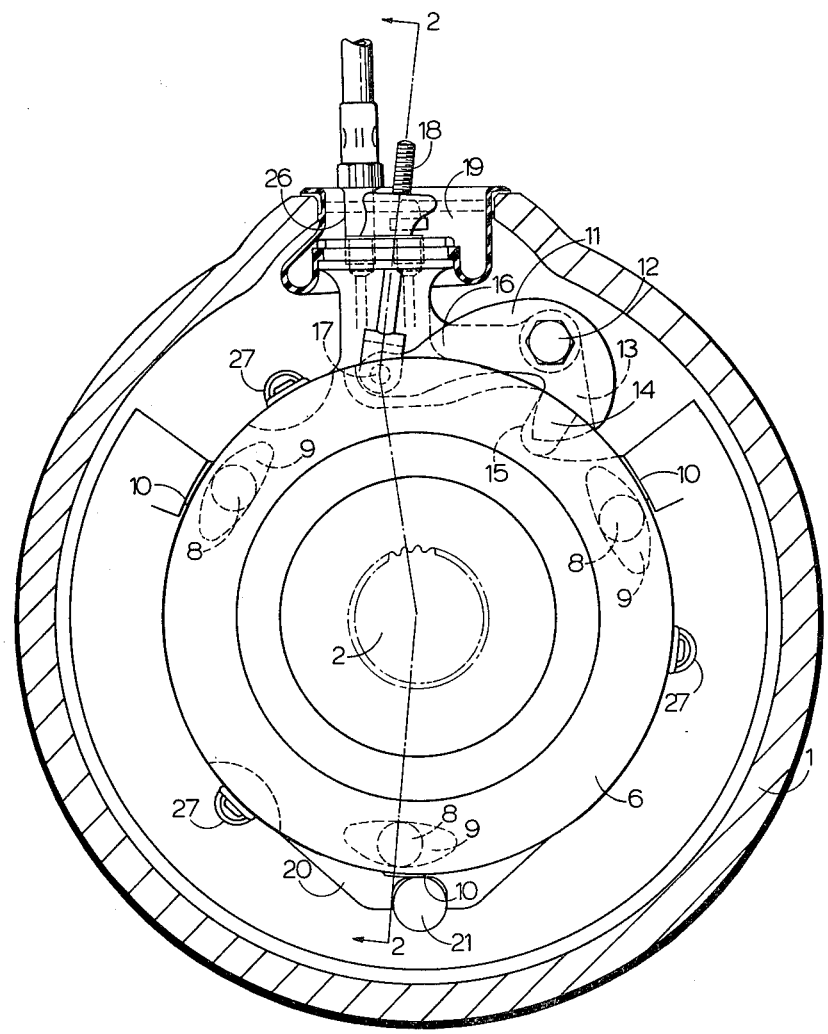

United States Patent [19]

Price et al.

[11] 4,358,002
[45] Nov. 9, 1982

[54] SPREADING DISC BRAKES FOR VEHICLES
[75] Inventors: Anthony G. Price, Birmingham; Robert A. Anderson, Solihull, both of England
[73] Assignee: Lucas Industries, Limited, Birmingham, England
[21] Appl. No.: 76,494
[22] Filed: Sep. 17, 1979
[30] Foreign Application Priority Data
Sep. 26, 1978 [GB] United Kingdom ............... 38096/78
[51] Int. Cl.³ ............................................. F16D 65/56
[52] U.S. Cl. .................................. 188/71.9; 188/71.4; 188/72.2; 188/196 BA; 192/70; 192/99 A; 192/111 A
[58] Field of Search ................. 188/71.4, 72.2, 106 F, 188/71.8, 72.9, 196 BA, 79.5 P, 72.6, 71.9; 192/70, 111 A, 99 A

[56] References Cited
U.S. PATENT DOCUMENTS

| 2,799,366 | 7/1957 | Zindler | 188/72.2 |
| 2,874,807 | 2/1959 | Hahn | 188/71.4 |
| 2,937,721 | 5/1960 | Parrett | 188/71.4 |
| 3,717,227 | 2/1973 | Rath | 188/196 BA X |
| 3,842,948 | 10/1974 | Fredrick | 188/71.4 |
| 4,024,931 | 5/1977 | Klaue | 188/71.4 X |

FOREIGN PATENT DOCUMENTS

| 738053 | 7/1943 | Fed. Rep. of Germany | 188/71.4 |
| 2640304 | 3/1978 | Fed. Rep. of Germany | 188/71.4 |
| 1075375 | 4/1954 | France | 188/71.4 |
| 803524 | 10/1958 | United Kingdom | 188/72.9 |
| 1191320 | 5/1970 | United Kingdom | 188/79.5 P |
| 1198362 | 7/1970 | United Kingdom | 188/79.5 P |

Primary Examiner—George E. A. Halvosa
Attorney, Agent, or Firm—Scrivener, Clarke, Scrivener and Johnson

[57] ABSTRACT

The brake application of a spreading disc brake is effected by moving pressure plates in opposite directions into engagement with friction discs. This can be achieved hydraulically by pressurization of a pressure space between an annular cylinder in the plate and an annular piston in the plate and which works in the cylinder. Also this can be achieved mechanically by a brake-applying pull rod which is connected to a cranked lever pivotally connected to the plate and acting on the plate. The lever may act directly on the plate or it may act on the plate through an automatic slack adjuster.

6 Claims, 10 Drawing Figures

SPREADING DISC BRAKES FOR VEHICLES

SPECIFIC DESCRIPTION

This invention relates to improvements in self-energising spreading disc brakes of the kind in which rotatable friction discs provided with friction linings are adapted to be brought into engagement with spaced opposed radial surfaces in a housing by pressure plates located between the friction discs and centered by stationary pilot lugs. Balls or rollers are located in co-operating oppositely inclined recesses in the adjacent faces of the pressure plates and the application of the brake is initiated by moving the pressure plates in opposite directions into engagement with the friction discs which are urged into engagement with the radial surfaces. The pressure plates are carried round with the friction discs until one is arrested by the engagement of a lug on the plate with a drag-taking stop abutment in the housing and the continued angular movement of the other pressure plate provides a servo action.

Self-energising brakes of that kind may be "dry" or "oil-immersed" with the housing filled with oil. Such brakes are commonly used on tractors and like vehicles and hereinafter will be called brake of the kind set forth.

In known brakes of the kind set forth the angular movement of the pressure plates to initiate the application of the brake is commonly effected mechanically by a pair of radially extending toggle links connected between radially projecting bosses on the plates, and a pull-rod connected to the links. In such a brake the free ends of the toggle links are pivotally connected to the bosses which requires the provision of separate pivotal connections. Adequate space in a radial direction is required in the housing to accommodate the toggle links. Also an opening in the housing through which the pull-rod projects has to be of substantial length in a circumferential direction to accommodate the maximum angular movement of the rod with the toggle links and the plates when the brake is applied with the friction discs rotating in either of two opposite directions. Furthermore it is difficult to adapt a brake of the kind set forth for hydraulic actuation, without increasing substantially the overall axial length of the brake.

According to one aspect of our invention in a self-energising spreading disc brake of the kind set forth a cranked lever pivotally mounted on one of the pressure plates by a first pivotal connection is pivotally coupled at one end to a brake-applying pull-rod by a second pivotal connection and at the other end acts on the other pressure plate so that angular movement of the lever about the first connection in response to movement of the pull-rod in a brake-applying direction urges the pressure plates angularly in opposite directions.

Since the lever is pivotally mounted on one of the pressure plates, bodily circumferential movement of the lever relative to the housing is limited to the extent of the angular circumferential movement of the plate on which it is mounted. Thus, the movement of the lever, and in consequence, that of the rod, in a circumferential direction relative to the housing is substantially the same as that of the plate on which the lever is mounted. Therefore the circumference length of an opening in the housing through which the rod projects need only be sufficient to accommodate this movement which is relatively small.

The lever may engage directly with the said other pressure plate.

Preferably, however, the lever acts on the said other plate through an automatic slack adjuster which is operative automatically to determine a relative angular position between the pressure plates at which the braking clearances are maintained substantially at constant values.

The automatic adjuster may comprise a screw-threaded strut acting at opposite ends between the lever and the said other pressure plate and of which the effective length is adjustable to compensate for wear of the friction discs, a pawl pivotally mounted on the strut and engageable at one end with a toothed wheel on the strut, the toothed wheel being rotatable to alter the effective length of the strut, and a spring adapted to hold the pawl in abutment with the lever during an adjustment stroke in which the pawl can rotate the wheel to increase the effective length of the strut until the force in the spring is overcome by the brake applying load, whereafter the pawl and the lever can move relatively away from each other to preclude further adjustment.

When the brake is assembled, several displacements of the pull-rod are necessary to take out excessive running clearances due to tolerances. Between each displacement, the accompanying relaxation of the input load enables brake return springs to re-position the pawl in its initial position by sliding over the toothed wheel under slight contact load without imparting ant reverse motion to the toothed wheel. As the running clearances diminish so does the extent of movement of the end of the pawl until, when the ideal running clearance is achieved, the movement of the end of the pawl is equal to the pitch of the toothed wheel. No further adjustment will occur until the end of the pawl moves through a sufficient distance for it to engage with an adjacent tooth of the wheel. This will only happen when sufficient wear of the friction surfaces has taken place.

When a brake of the kind set forth has been adjusted to an ideal running clearance, the automatic slack adjuster is required to operate only very occasionally since the friction surfaces wear very slowly. To ensure therefore that the slack adjuster will operate on the rare occasions when required so to do it is convenient to incorporate it in a "oil-immersed" brake of the kind set forth so that it will be fully lubricated at all times.

The pawl may be generally in the form of a quadrant with the teeth located at its arcuate end and the quadrant is pivotally connected at its opposite end to the strut, the spring comprising a tension spring.

The spring may act at opposite ends between the pawl and the lever to urge an abutment face of the pawl into engagement with the lever. When adjustment is taking place the pawl and the lever move in unison.

In a modification the lever has an additional arm which extends circumferentially from the first pivotal connection to a positon beyond the engagement between the strut and the said other pressure plate, and the spring acts between intermediate points in the lengths of the pawl and the arm normally to urge the pawl into abutment with a nose on the arm. This magnifies the velocity ratio to reduce the number of displacements of the pull-rod which are required to take-up excessive running clearances. In this construction the pawl and the lever do not move in unison, although the nose and the pawl are held in contact during the adjustment stroke.

Brakes of the kind set forth may incorporate an hydraulic actuator, suitably an hydraulic piston and cylinder assembly, which is defined between the two pressure plates and by means of which the brake is actuated for normal service braking. In such a brake, when the brake is operated hydraulically, there is zero load in the strut of the adjuster and it becomes slack. For this reason the slack adjuster is incorporated in the mechanical parking or emergency braking actuator. Thus the slack adjuster is made "load-insensitive".

In particular, according to another aspect of our invention in the brake of the kind set forth an hydraulic actuator is provided in the pressure plates, the hydraulic actuator comprising complementary interengaging axially slidable surfaces in the pressure plates, annular elastomeric seals between the slidable surfaces, and a pressure space defined between the seals in which is adapted to be pressurised by hydraulic fluid to urge the plates away from each other in opposite direction and into engagement with the discs.

The hydraulic actuator is therefore conveniently incorporated within the brake without increasing substantially the overall axial length of the brake.

Each pressure plate may include two axially and radially spaced circular surfaces which are interconnected at their inner ends by an annular face, and an annular seal is located in one circular surface of each pair of complementary surfaces for sealing engagement with the other surface of that pair, the annular faces being urged apart when the pressure space is pressurised.

Figure 2:
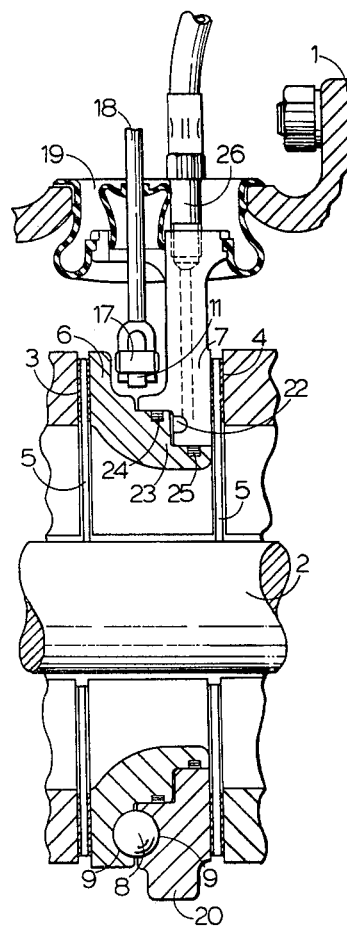
Figure 3:
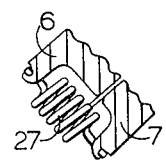
Figure 4:
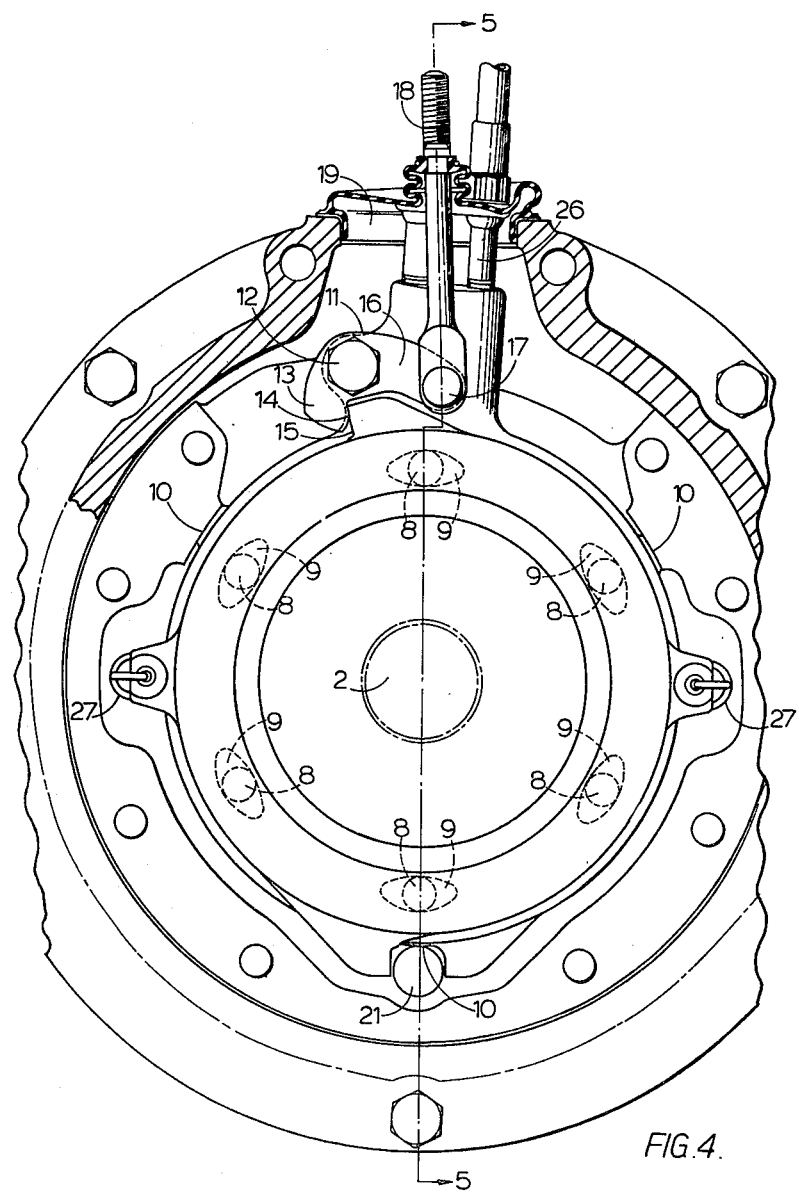
Figure 5:
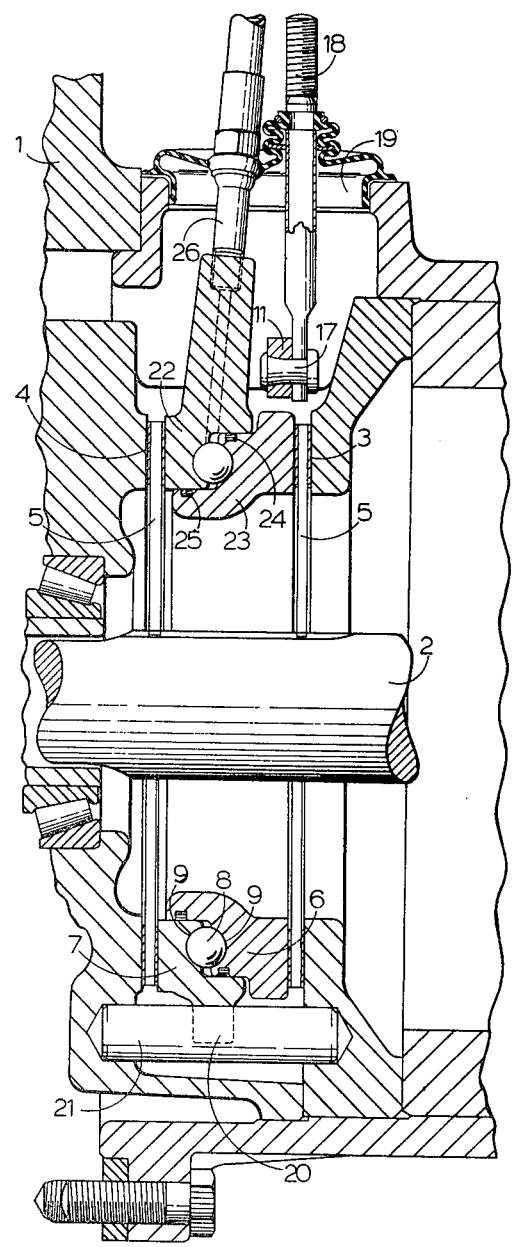
Figure 6:
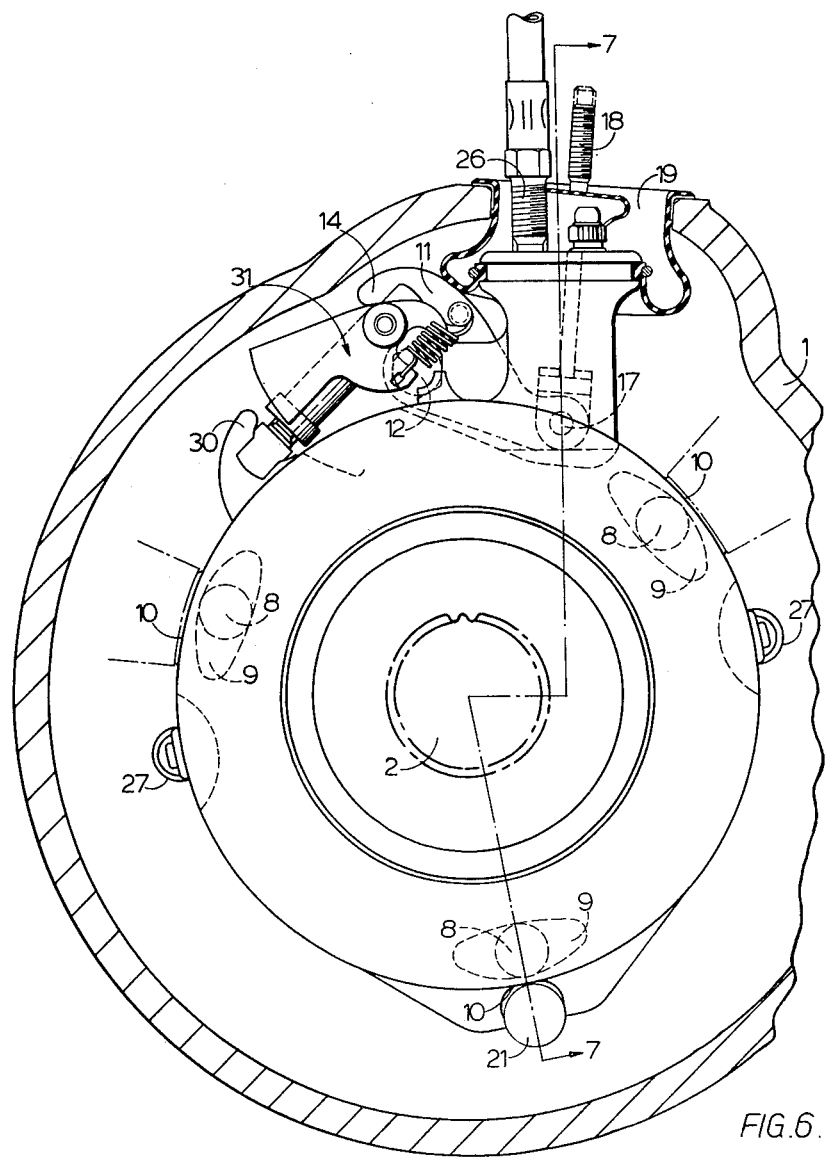
Figure 7:
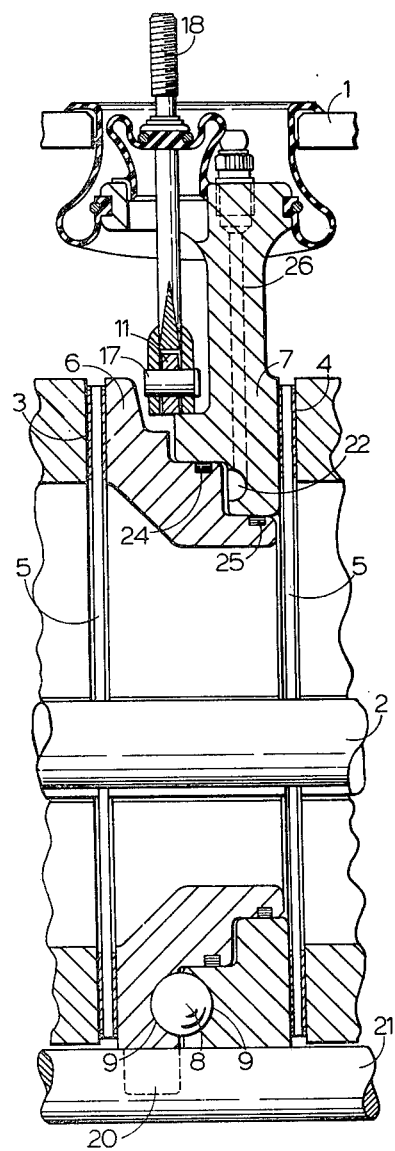
Figure 8:
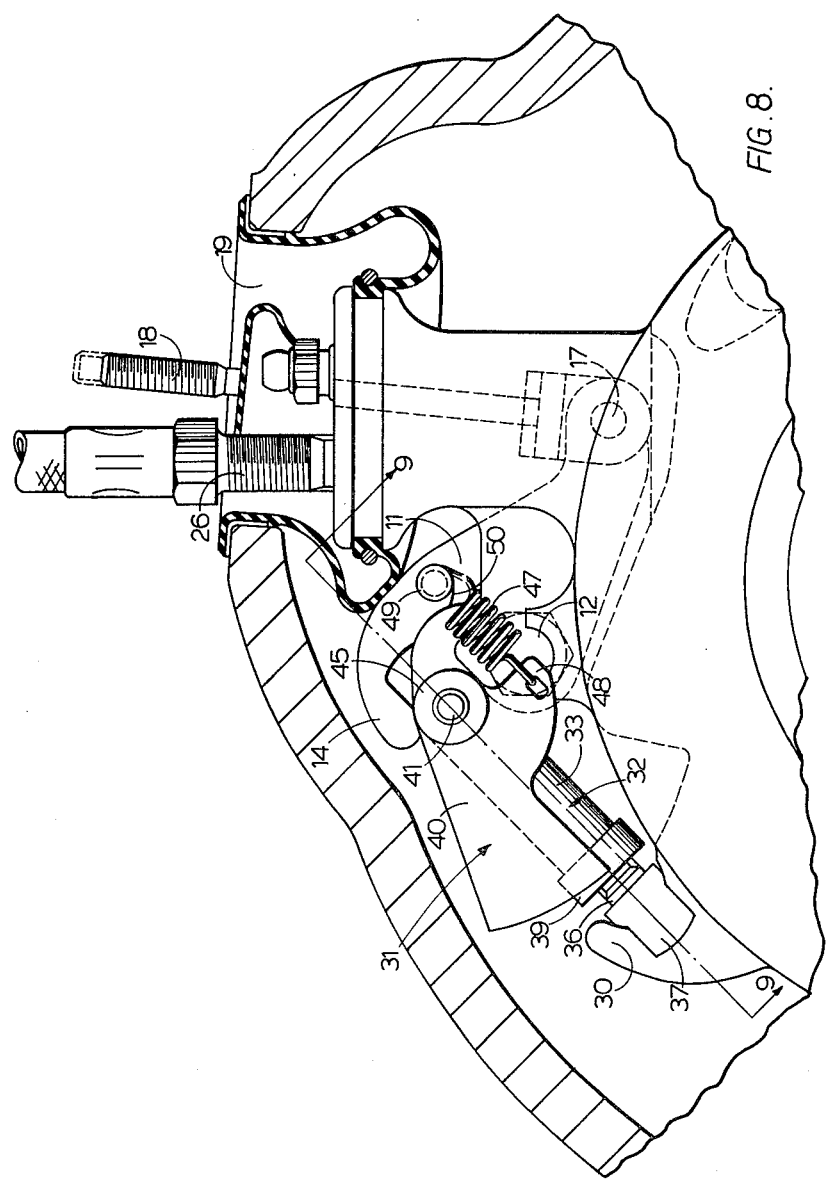
Figure 9:
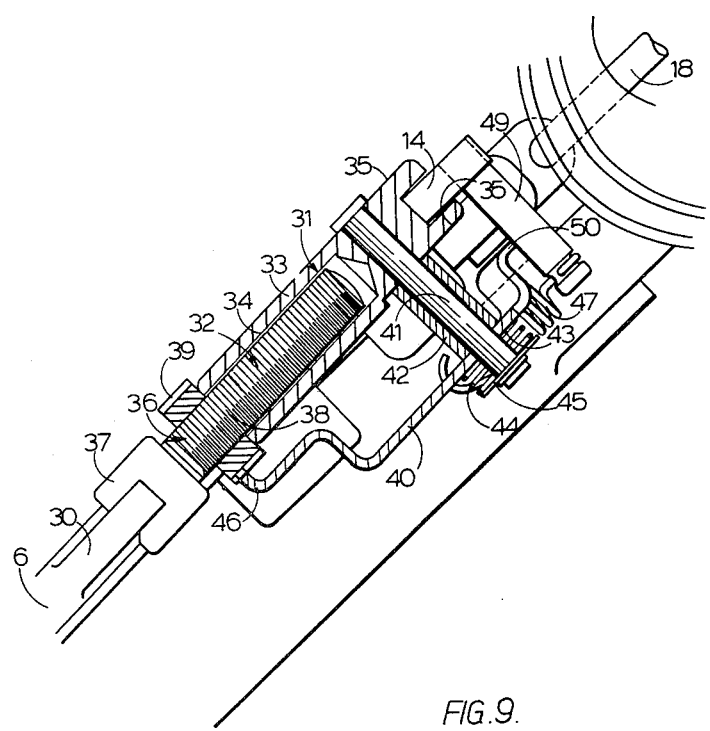
Figure 10:
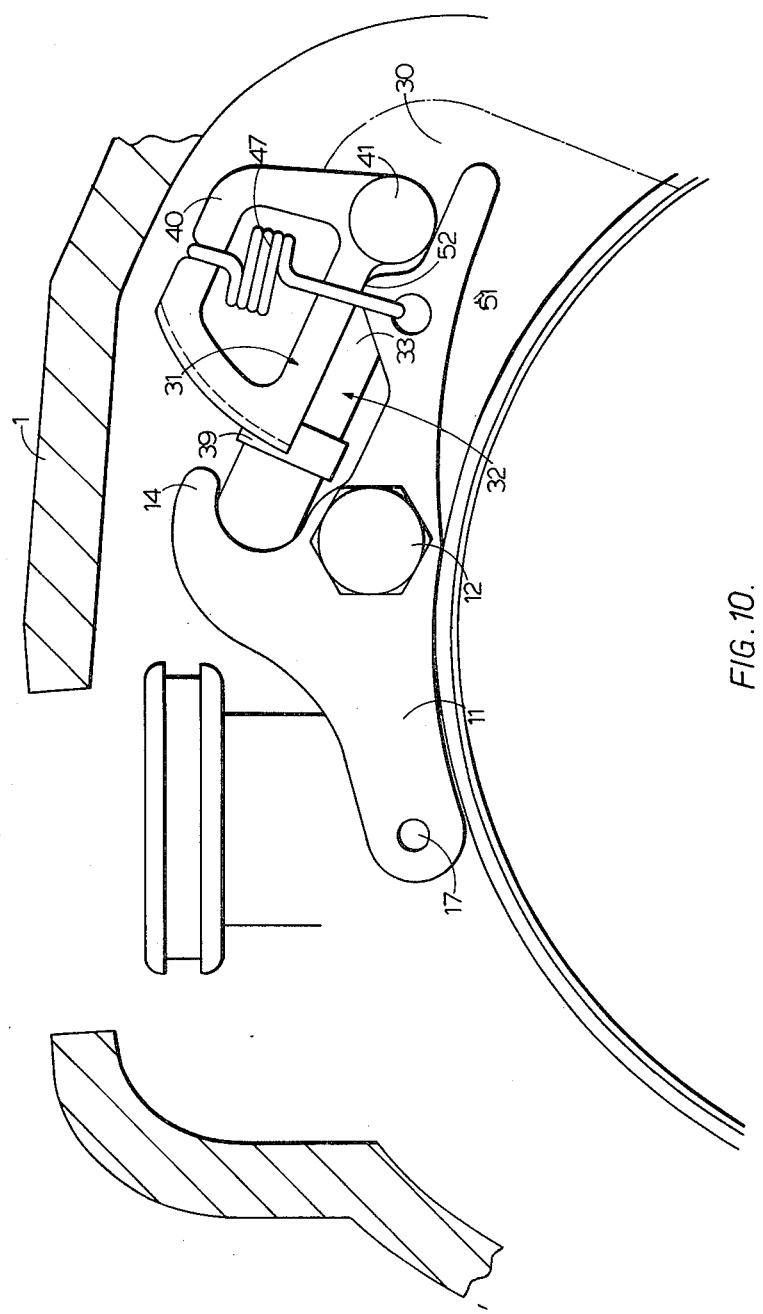

Some embodiments of our invention are illustrated in the accompanying drawings in which:

FIG. 1 is a plan of a disc brake of the kind set forth;
FIG. 2 is a section on the line 2—2 of FIG. 1;
FIG. 3 is a view of a return spring;
FIG. 4 is a view similar to FIG. 1 of another brake;
FIG. 5 is a section on the line 5—5 of FIG. 4;
FIG. 6 is a view similar to FIG. 1 of yet another brake;
FIG. 7 is a section on the line 7—7 of FIG. 6;
FIG. 8 is a view on an enlarged scale of the mechanical applying mechanism and automatic slack adjuster of FIG. 6;
FIG. 9 is a section on the line 9—9 of FIG. 8; and
FIG. 10 is a view similar to FIG. 8 of a modified slack adjuster.

The spreading brake illustrated in FIGS. 1 to 3 of the drawings is adapted for braking a shaft for transmitting drive to a wheel of a vehicle. The brake comprises a housing 1 into which the shaft 2 extends, the housing having at opposite ends axially spaced radial braking surfaces 3, 4 between which are located rotatable friction discs 5. The discs 5 are slidably keyed to the shaft 2.

An expander mechanism is located between the discs 5. The mechanism comprises two angularly movable pressure plates 6 and 7 in the form of rings which are located between the discs 5, and balls 8 located in oppositely inclined co-operating recesses 9 in adjacent faces of the plates 6, 7. The plates are centered on angularly spaced pilots 10 in the housing 1.

A cranked lever 11 is pivotally connected by a first pivotal connection 12 to a radial lug 13 on the pressure plate 7, and at its cranked free end 14 acts on a radial abutment face 15 on plate 6. At its opposite free end of the longer arm 16 the lever 11 is connected by the second pivotal connection 17 to the inner end of a pull-rod 18 which projects from the brake through an opening 19 in the housing 1.

Movement of the pull-rod 18 in a radial brake-applying direction is effected by a hand brake mechanism and initiates angular movement of the pressure plates 6, 7 in relatively opposite directions by moving the lever 11 angularly about the pivotal connection 12. The balls 8 then tend to ride out of the recesses 9 and urge the plates 6, 7 apart and into engagement with the friction discs 5 which are then urged into engagement with the radial surfaces 3, 4 in the housing. When the discs 5 are rotating, the pressure plates 6, 7 are carried round with the discs 5 until one of the plates, for example the plate 6, is arrested by the engagement of a lug 20 on that plate with a pin 21 which acts as a stop abutment and also comprises one of the pilots 10. Continued angular movement of the other pressure plate 7, known as the energising plate, provides a servo action to intensify the braking force.

The plate 7 is stepped inwardly of its peripheral edge to form a stepped wall comprising an annular hydraulic cylinder 22 in which works a complementary stepped portion on the other plate 6 comprising an integral annular piston 23. Annular elastomeric seals 24 and 25 in the two circular surfaces of the piston 23 engage slidably with corresponding circular surfaces of the wall of the cylinder 22.

For normal service braking hydraulic fluid under pressure can be introduced into the cylinder 22 through a union 26 which comprises an extension on the wall of the plate 7. This acts between annular faces between the adjacent circular surfaces to urge the plates 6 and 7 axially away form each other to clamp the friction discs 5 between the pressure plates 6 and 7 and the radial surfaces 3 and 4. The pressure plates 6 and 7 are carried round with the discs until one of the plates is arrested by the engagement of the lug 20 on that plate with the pin 21. Thereafter the application of the brake is as described above with a servo action produced to intensify the braking force. During this action the piston 23 and the cylinder 22 move relatively in a helical path.

Angularly spaced compression return springs 27 act between the pressure plates 6 and 7 to urge them towards each other and into a retracted position at the termination of a brake application.

In the brake of FIGS. 1 to 3 the balls 8 and the recesses 9 in the plates 6 and 7 in which they are located are disposed radially outwards of the piston 23 and the cylinder 22.

In the brake illustrated in FIGS. 4 and 5 the recesses are formed between the seals 24 and 25 in the complementary annular faces of the piston 23 and the cylinder 22 between the adjacent circular surfaces so that the balls 8 are located in recesses 9 which are lubricated at all times by the hydraulic fluid in the cylinder 22. This facilitates operation of the expander mechanism.

The construction and operation of the brake of FIGS. 4 and 5 is the same as that of the brake of FIGS. 1 to 3, and corresponding reference numerals have been applied to corresponding parts.

In the brake illustrated in FIGS. 6 to 9 the cranked arm 14 of the lever 11 acts on a radial lug 30 on the plate 7 through an automatic slack adjuster 31.

The slack adjuster 31 comprises a strut 32 which includes an outer member 33 having a blind longitudinal bore 34. The outer member 33 has at its closed end a pair of lugs 35 between which the arm 14 is received to hold the member 33 against rotation. An inner member 36 having a bifurcated head 37 in which the lug 30 is received has a screw-threaded stem 38 which projects into the bore 34 of the outer member 33 in which it is a clearance fit. A toothed wheel 39 is screwed onto the stem 38 and abuts against the adjacent end of the outer member 33.

A pawl 40 of pressed metal construction and of generally quadrant outline is mounted on the strut 32 by means of a third pivotal connection 41 which is parallel to the first connection 12 and passes through spacer sleeves 42 and an opening 43 adjacent to the smaller end of the pawl 40. The pawl 40 is urged into abutment with the end of the sleeve 42 by means of a compression spring 44, acting between the pawl 40 and the washer 45. The free arcuate end of the pawl 40 is cranked inwardly to form ratchet teeth 46 for engagement with the teeth on the wheel 39 so that the wheel 39 can be rotated when the pawl is moved in an arcuate path about the connection 41 as an axis.

Finally a pre-loaded tension spring 47 is anchored at opposite ends between a lug 48 on the pawl 40 and the free end of a pin 49 which is normal to the plane of the lever 11. The spring 47 acts normally to urge an abutment face 50 on the pawl 40 into abutment with the lever pin 49.

When the brake is applied mechanically, angular movement of the lever 11 about the first connection 12 moves the plates 6 and 7 angularly in opposite directions with the arm 14 acting on the plate 6 through the strut 32 and the reaction on the connection 12 urging the plate 7 in the opposite direction.

Assuming that the brake is adjusted to an ideal running clearance, the resistance to the brake applying load, which is transmitted through the screw-heads of the strut 32 and between the toothed wheel 39 and the outer member 33, is greater than the force in the spring 47 which urges the pawl 40 into engagement with the teeth on the toothed wheel 39. Thus no rotation of the wheel 39 to increase the length of the strut takes place and the spring 47 extends with the lever 11 moving relatively away from the pawl 40. The movement of the pawl 40 is equal to the pitch of one tooth on the wheel 39.

Should the running clearance have become excessive due to wear of the friction linings, when the brake is applied mechanically, initially the pawl 40 and the lever 11 move in unison with the pawl 40 rotating the wheel 39 to increase the effective length of the strut 32. This continues until resistance to the brake applying load again exceeds the force in the spring 47 so that further adjustement is precluded. Upon release of the brake the pawl 40 is returned by the spring 47 to its initial position in abutment with the lever 11.

When the brake is first assembled, or is otherwise re-built, the initial running clearance may be excessive. To provide the brake with an ideal running clearance the hand brake mechanism is operated several times to cause sucessive displacement of the pawl-rod 18. On each occasion the pawl 40 rotates the wheel 39 to increase the effective length of the strut 33. Between each displacement the accompanying relaxation of the input load enables the return spring 27 to return the pawl 40 to its initial position by sliding over the wheel 39 as described above. During initial operation of the hand brake mechanism a reaction sufficient to cause the lever 11 to separate from the pawl 40 may not be encountered, and a considerable number of operations of the hand brake mechanism may be required before ideal running clearance is achieved, when the movement of the pawl 40 is equal to the pitch of the toothed wheel 39.

The construction and operation of the brakes of FIGS. 6 to 9 is otherwise the same as that of the two preceding embodiments, and corresponding reference numerals have been applied to corresponding parts.

In the brakes described above the opening 19 in the housing 1 through which the rod 18 projects need only be of sufficient length in a circumferential direction to accommodate the relatively small angular movement of the rod 18 with the plate 7 on which the lever is pivotally mounted.

Also the brakes described above may be of the "oil-immersed" type with the housing filled with oil. It is preferred in any case that the brake of FIGS. 6 to 9 is of this type to lubricate at all times the automatic adjuster 31 which operates only occasionally after an ideal braking clearance has been achieved.

In the brake of FIG. 10 the adjuster 31 is of modified construction. Specifically the lever 11 has an additional arm 51 which extends circumferentially away from the cranked arm 14 and the first pivotal connection 12 to a position beyond the engagement between the strut 32 and the lug 30 on the plate 6. The strut 32 is turned end-to-end and the pawl 40 is connected to the strut 32 by the third pivotal connection 41 which is located adjacent to the lug 30. The spring 47 acts between anchorages at intermediate points in the lengths of the arm 51 and the pawl 40, normally to urge the pawl 40 into abutment with a nose 52 on the arm 51.

This arrangement of the pivotal connection 41 and the nose 52 magnifies, in comparison with FIGS. 6 to 9, the velocity ratio to reduce the number of displacements of the pull-rod 18 which are required to take up excessive running clearances.

In the construction of FIG. 10 the pawl 40 and the lever 11 do not move in unison, although the nose 52 and the pawl 40 are held in contact by the spring 47 during the adjustment stroke.

The construction and operation of the brake of FIG. 10 is otherwise the same as that of FIGS. 6 to 9 and corresponding reference numerals have been applied to corresponding parts.

We claim:

1. A self-energising spreading disc brake comprising a housing having opposed spaced radial surfaces, friction discs within said housing provided with friction linings for engagement with said radial surfaces, stationary pilot lugs in said housing, pressure plates located between said friction discs and centered by said pilot lugs, a stop abutment in said housing, a radial projection on each said pressure plate, said pressure plates having adjacent faces provided with co-operating oppositely inclined recesses, and balls or rollers located in said recesses, wherein said brake is initiated by moving said pressure plates in opposite directions into engagement with said friction discs which, in turn, are urged into engagement with said radial surfaces whereafter said pressure plates are carried round angularly with said discs until one is arrested by said stop abutment and the continued angular movement of the other provides a servo-action, a cranked lever having a first end and a second end, a first connection pivotally connecting said cranked lever intermediate its ends to a radial projection on one of said pressure plates, a brake-applying pull-rod, a second connection pivotally connecting said first end of said lever to said pull-rod, and an automatic adjuster through which said second end of said lever acts directly to apply a thrust to the other of said pressure plates whereby movement of said pull-rod in a brake-applying direction urges said pressure plates angularly in opposite directions, said adjuster being operative automatically in response to movement of said lever to determine a relative angular position between said pressure plates at which braking clearances are maintained substantially at constant values, said adjuster comprising a screw-threaded strut acting at opposite ends between said lever and said radial projection on the other pressure plate and of which the effective length is adjustable to compensate for wear of said friction discs, a toothed wheel on said strut, a pawl pivotally mounted directly onto said strut and engageable at one end with said toothed wheel, said toothed wheel being rotatable to alter the effective length of said strut, and a spring adapted to hold said pawl in abutment with said lever during an adjustment stroke in which said pawl can rotate said wheel to increase the effective length of said strut until the force in said spring is overcome by the brake applying load, whereafter said pawl and said lever can move relatively away from each other to preclude further adjustment.

2. A disc brake as claimed in claim 1, wherein said pawl is generally in the form of a quadrant having an arcuate end with the teeth located at said arcuate end, and said quadrant is pivotally connected at its opposite end to said strut, said spring comprising a tension spring.

3. A disc brake as claimed in claim 1, wherein said spring acts at opposite ends between said pawl and said lever to urge an abutment face on said pawl into engagement with said lever.

4. A disc brake as claimed in claim 1, wherein said lever has an additional arm which extends circumferentially from said first pivotal connection to a position beyond the engagement between said strut and said other pressure plate, said arm having a nose, and said spring acts between intermediate points in the lengths of said pawl and said arm normally to urge said pawl into abutment with said nose.

5. A disc brake as claimed in claim 1, incorporating an hydraulic actuator for normal service braking.

6. A disc brake as claimed in claim 5, wherein said hydraulic actuator comprises an hydraulic piston and cylinder assembly which is defined between said pressure plates.

* * * * *